(12) United States Patent
Opstad

(10) Patent No.: US 7,719,537 B2
(45) Date of Patent: May 18, 2010

(54) METHOD FOR REDUCING SIZE AND INCREASING SPEED FOR FONT GENERATION OF INSTRUCTIONS

(75) Inventor: David G. Opstad, Mountain View, CA (US)

(73) Assignee: Monotype Imaging Inc., Woburn, MA (US)

( * ) Notice: Subject to any disclaimer, the term of this patent is extended or adjusted under 35 U.S.C. 154(b) by 146 days.

(21) Appl. No.: 11/507,456

(22) Filed: Aug. 22, 2006

(65) Prior Publication Data

US 2008/0049023 A1 Feb. 28, 2008

(51) Int. Cl.
*G06T 11/00* (2006.01)
*G06K 9/46* (2006.01)
*G06K 15/02* (2006.01)

(52) U.S. Cl. .................. 345/467; 382/246; 358/1.11
(58) Field of Classification Search ............. 382/246; 345/467, 469; 358/1.1, 1.11
See application file for complete search history.

(56) References Cited

U.S. PATENT DOCUMENTS 5,577,183 A * 11/1996 Weyand .................. 358/1.15
5,995,118 A * 11/1999 Masuda .................. 345/467
6,031,622 A * 2/2000 Ristow et al. ............ 358/1.11
6,249,908 B1 * 6/2001 Stamm .................... 717/113
2005/0008238 A1 * 1/2005 Chiu et al. ............... 382/233

OTHER PUBLICATIONS

Apple Computer, Inc. TrueType Reference Manual. The Font Engine. 2003.*
Apple Computer, Inc. TrueType Reference Manual. The Instruction Set. 2003.*

* cited by examiner

*Primary Examiner*—Kee M Tung
*Assistant Examiner*—Jacinta Crawford
(74) *Attorney, Agent, or Firm*—Breiner & Breiner, L.L.C.

(57) ABSTRACT

A method for compressing font instruction data. The method includes analyzing a set of pixel-per-em values and fractional pixel shifts contained in font instruction for each glyph in a font data set to construct a database of values. The pixel-per-em values and fractional pixel shifts are converted into operational codes and argument values and these values are compressed into a compressed data stream including a series of multiple-bit words representing font instruction specifications for each glyph in the font data. In addition, fixed environmental variable values are set for each glyph based on the font instruction data. When a glyph is to be rendered using the compressed font instruction, the compressed instruction is decompressed and only relevant multiple-bit word or words corresponding to font instruction specifications for the respective glyph are executed, but not any of the 16-bit words corresponding to font instruction for the fixed environmental values.

14 Claims, 2 Drawing Sheets

METHOD FOR REDUCING SIZE AND INCREASING SPEED FOR FONT GENERATION OF INSTRUCTIONS

FIELD OF THE INVENTION

The present invention relates to a method for processing font instruction data and, in particular, a method for compressing font instruction data and selectively executing only relevant data during font character rasterization.

BACKGROUND OF THE INVENTION

The appearance and layout of a typical text document, e.g. a word processing document or a media presentation document, is determined by the selection of fonts used to display the characters which comprise the text document. To accurately render a text document, often it is necessary to vary the size or resolution of the font, depending on the display or printer used to view the contents of the document.

Mathematical algorithms are used to scale a font character and render the font characters at various sizes and resolutions. However, as a font size and display or printer resolution is varied, anomalies or imperfections occur in characters to be rendered. Different techniques have been developed to address these issues. One mathematical scheme to correct font scaling and resolution errors and to restore character aesthetics is referred to as hinting. Hinting corrects the pixels of a font character scaled to a given size and resolution using any number of techniques for restoring the native shape, aesthetics and legibility of the character.

Hinting consists of making minor corrections to the outline of a font character. For example, at low resolution, rounding effects may result in portions of a character disappearing, or other parts appearing too thick or too thin. Hinting addresses these and other anomalies by equalizing the weights of stems and preventing parts of glyphs from disappearing as the rendering resolution is decreased.

One type or family of fonts, which are mathematically scalable, are TrueType fonts. In TrueType fonts, each glyph or character form contains a respective hint program, i.e. a script or algorithm, which includes instructions for manipulating various control points of the respective glyph outline just prior to rasterization. As a result, the outline of the glyph is mathematically altered by the respective glyph's hinting instruction to surround only the pixels that produce a desired bitmap image of the glyph. The hinting instruction of TrueType fonts includes loops, conditional branches, user-definable functions, instructions to move, align and interpolate points in various ways—often with reference to "control values," methods to round points to the "grid" of the device, and arithmetic and logical instructions.

The TrueType hinting language is "stack-based," like PostScript®, meaning that the instructions take all their arguments from the stack. Instructions take the form of single-byte codes. However, unlike PostScript®, there are explicit PUSH instructions to push bytes and words from the instruction stream (these are the only instructions to take arguments from the stack).

Prior to applying one or more hints specific to a glyph, the glyph is scaled with respect to the current pixels-per-em, (hereinafter "ppem"). The ppem value is a measure of the number of pixels available for rasterization, derived from point-size and resolution. All the glyph's coordinates are measured in fractional pixels, rather than integral font design units. Coordinates are "F26DOT6" values: 32-bit fixed-point numbers with six fractional bits. Each point is stored twice: once for its original position, once for its current "instructed" position.

There are instructions for absolute and relative movements with measurements taken from the stack, the Control Value Table (hereinafter, "CVT"), or from other points that have already been moved. All moving of points takes place with respect to two vectors: the Projection Vector P, along which all measurements are taken, and the Freedom Vector F, along which movement actually occurs. Flexibility of TrueType font rendering lies, in part, from the independence of these vectors, and the ability to set them diagonally.

One important objective of hinting is to preserve the "spirit" of a typeface throughout all its characters or glyphs. This is the purpose of TrueType's CVT. It should contain measurements that are used frequently within the hints for each glyph. The CVT is always "scaled" to the current ppem. Sample CVT entries might be: how thick are the vertical stems, how thick are the horizontal stems, how thick are the serifs, and by how much do round features overshoot the baseline?

During rendering, it may be necessary to manipulate points that are not part of the final outline. In TrueType, the non-outline points, referred to as "twilight zone points" are often initialized in the CVT Program ('prep'). Values in the each fonts' 'maxp' table declare the number of twilight points and storage locations.

These prior methods of executing respective correction programs to render each font glyph or character consumes a huge amount of computer power and time when displaying characters. What is needed in the art is a method of streamlining font hinting which more efficiently renders characters.

SUMMARY OF THE INVENTION

The present invention relates to a method for reducing size and increasing speed for font generation of font instructions by converting font instructions, such as pixel-per-em values and fractional pixel shifts, into shorthand notation in the form of operational codes ("OPCODES") and argument values, referred to as OPERANDS. These OPCODES and OPERANDS are created for each glyph in a font data set. The OPCODES and OPERANDS are then compressed into a compressed data stream which comprises multiple-bit words, representing font instructions for each glyph originally represented as pixel-per-em values and fractional pixel shifts.

In one specific embodiment, the pixel-per-em values and fractional pixel shifts are contained in the font instruction as one-byte codes. The OPCODES and OPERANDS are variable length values representing, in shorthand, various pixel-per-em values and fractional pixel shifts. The variable length OPCODES and OPERANDS are further compressed into a series of 16-bit words which contain variable length OPCODES and OPERANDS. Finally, the 16-bit words are associated with the font data. When the font is used to render one or more glyphs of a particular size, the compressed data is acted upon to selectively choose relevant instruction while ignoring environmental variables and all other specifications accommodated as fixed values deciphered from the context in which the glyph is to be rasterized. As a result, the present method allows for executing less code and, consequently, renders font glyphs more quickly.

The present invention, in one form thereof, is a method for processing font data comprising font instruction. The method includes analyzing a set of pixel-per-em values and fractional pixel shifts contained in font instructions to construct a database of values. The pixel-per-em values and fractional pixel shifts are converted into operational codes and argument values for each glyph in the font data. The operational codes and argument values are compressed into a compressed data stream comprising a series of multiple-bit words representing font instruction specifications for each glyph in the font data.

In one specific embodiment, the font instruction is selected from the group consisting of DELTAP1, DELTAP2, DELTAP3, SDS, SDB, SVTCA, PUSHB, PUSH2, NPUSHB, and NPUSHW.

In an alternative further embodiment, the operational codes and argument values are variable length codes and the multiple-bit words comprise 16-bit words.

The present method, in yet another form thereof, is a method for rendering a glyph from font data having compressed font instruction in the form of a series of multiple-bit words representing pixel-per-em values and fractional pixel shifts forming instruction specifications and environmental values for respective glyphs in the font data. The method comprises setting values corresponding to environmental variable values for a glyph for (1) a numerically lowest shift value present for any point-per-em for the glyph, (2) a shift increment, (3) a lowest point-per-em value for which hints in the font instruction data are present, and (4) a variable multiple-bit value comprising fields comprising a point-per-em value, a count and a phase for use when decompressing font instruction data. The method further comprises decompressing the multiple-bit word or words corresponding to font instruction and executing only relevant font instruction specifications for the respective glyph and not any 16-bit words corresponding to font instruction for the fixed environmental values.

The present invention, in another form thereof, relates to a method for processing font data comprising font instructions. The method comprises analyzing a set of pixel-per-em values and fractional pixel shifts contained in the font instructions for each glyph in the font data to construct a database of values. The pixel-per-em values and fractional pixel shifts are converted into variable length operational codes and argument values for each glyph in the font data. The operational codes and argument values are compressed into a compressed data stream comprising a series of multiple-bit words representing font instruction specifications for each glyph in the font data. Fixed values are set corresponding to environmental variables for a glyph for 1) a numerically lowest shift value present for any point-per-em for the glyph, 2) a shift increment, 3) a lowest point-per-em value for which hints in the font instruction data are present, and 4) a variable multiple-bit word comprising a point-per-em value, a count and a phrase for use when decompressing font instruction data. The method further comprises decompressing the multiple-bit word or words corresponding to font instruction and executing only relevant font instruction specifications for a respective glyph and not multiple-bit words corresponding to font instruction for the fixed environmental values.

In one further embodiment, a glyph is rendered using a respective executed multiple-bit word or words.

DETAILED DESCRIPTION OF PREFERRED EMBODIMENT

Figure 1:
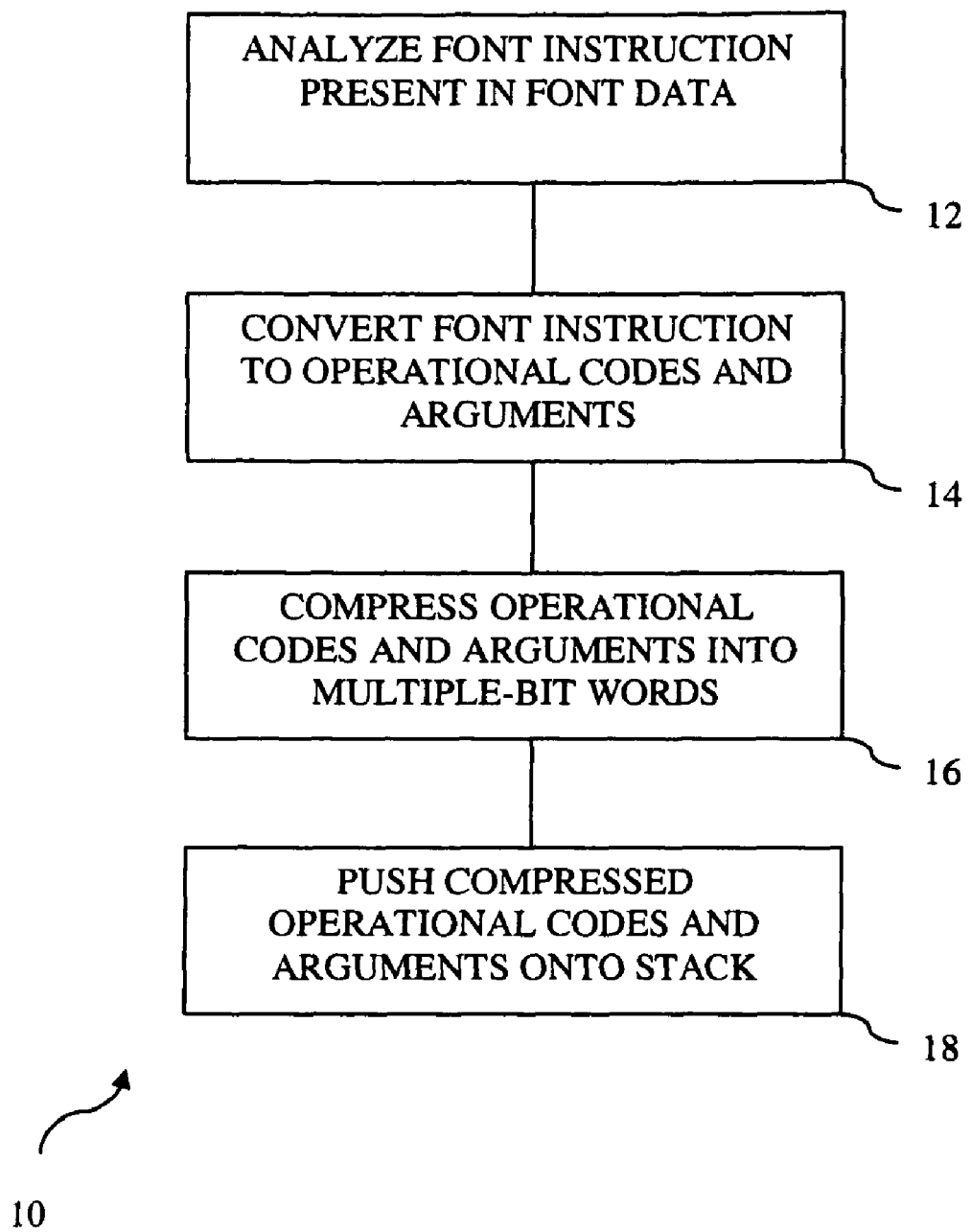
FIG. 1 is a flowchart showing one method for processing font data comprising font instruction to form compressed data for the font instruction in accordance with the present invention.

Referring now to the Figures and, in particular, FIG. 1, font instruction compression method 10 represents a method for analyzing font instruction contained in its native or original form and for generating a compressed representation of the font instruction which is subsequently associated with the font data. At step 12, font instruction is analyzed for hinting script or code, which is used when rendering a specific glyph present in the font data set. The font instruction can be PUSHB, PUSHW, NPUSHB, NPUSHW, SVTC (both X and Y), SDB, SDS, DELTAP1, DELTAP2 and DELTAP3 of TrueType fonts. Alternatively, the font instruction relating to glyph rendering can be any instruction which relates to point or bitmap manipulation of a glyph during rasterization. Typically, the font instruction will be in the form of one-byte codes which represent instruction for manipulating various control points of a respective glyph outline prior to rasterization.

At step 14, the identified font instruction is converted to a shorthand form represented by operational codes, referred to as OPCODES, thereby representing the identified font instruction. Variable length encoding is used, where the most common OPCODES and OPERANDS are the shortest (which is known as "Huffman encoding"). Advantageously, the OPCODES include the following codes:

| Opcode | Huffman Encoding | Interpretation |
| --- | --- | --- |
| 0 | 110 | Advance the pixels-per-em value by the repeatCount. Reset the repeatCount to 1. Reset delta to deltaBase. Reset pointBase to 0. |
| 1 | 111 | Advance the current delta repeatCount number of increments (skipping delta = 0). Reset pointBase to 0. Reset repeatCount to 1. |
| 2 | 0011 | Advance pointBase by 8 times repeatCount. Reset repeatCount to 1. |
| 3 | 000 | Advance pointBase by 16 times repeatCount. Reset repeatCount to 1. |
| 4 | 01 | Move a single point by the current delta. The OPCODE takes one OPERAND which is added to the pointBase to determine the point number to move. After moving, the pointBase is set to the point number just moved plus 2. |
| 5 | 10 | Move a group of points by the current delta. The first OPERAND is the number of points to be moved minus 1. The second OPERAND is added to the pointBase to get the point number of the first point in the group. After moving, the pointBase is set to the last point number in the group plus 2, unless the count was 8 in which case it is set to the last point number in the group plus 1. |
| 6 | 00101 | Set the repeatCount. The OPERAND is the desired repeatCount minus 4 (e.g. an OPERAND of 0 is interpreted as a repeatCount of 4). |
| 7 | 00100 | End of instructions. |

-continued

| Opcode | Huffman Encoding | Interpretation |
|--------|------------------|----------------|

In the OPCODE, the count for OPCODE 5 is interpreted such that a binary zero means one, since zero is never needed. Consequently, one means two, two means three and so on up to eight. The point numbers referred to by OPCODES 4 and 5 are not absolute point numbers. Rather, they are offsets from the current point base. The point base starts at zero. OPCODES 4 and 5 leave the point base at two greater than the last point number affected, unless the count is 8 in which case it will be left at one greater than the last point number affected. Delta advances always skip zero. The repeat count is used by OPCODES 0-3. These OPCODES reset it to one (its default value) after using it.

In addition to the OPCODES themselves being Huffman-encoded, the OPERANDS for OPCODES 4 and 6 are also Huffman-encoded. Certain OPERAND values are used much more frequently, and so these values are given the shortest possible length. OPERANDS for OPCODE 4 (values to be added to the pointBase to obtain the point number to be moved) are encoded thus:

| Value | Huffman Encoding |
|-------|------------------|
| 0 | 10 |
| 1 | 111 |
| 2 | 011 |
| 3 | 010 |
| 4 | 001 |
| 5 | 000 |
| 6 | 1101 |
| 7 | 1100 |

OPERANDS for OPCODE 6 (repeatCount minus 4) are encoded thus:

| Value | Huffman Encoding |
|-------|------------------|
| 0 | 11 |
| 1 | 00 |
| 2 | 011 |
| 3 | 1001 |
| 4 | 1000 |
| 5 | 0101 |
| 6 | 0100 |
| 7 | 101 |

The following, non-limiting example of DELTAP script compression is provided for exemplary purposes and in no way limits the scope of the present method. In this example, method 10 is used to translate the following DELTAP script into the present OPCODES, where the script is a set of hints in "python dictionary" whose keys are counterpoint numbers and whose values are in turn dictionaries whose keys are PPEM values and whose values are signed pixel shift amounts:

```
{   0:  {27: 1.0, 29: 1.0, 14: -1.0, 15: -1.0},
    1:  {16: -2.0, 14: -1.0, 15: -1.0},
    2:  {16: -1.0, 24: -1.0, 14: -1.0, 15: -1.0};
```

```
    3:  {14: -1.0, 15: -1.0},
    5:  {28: 2.0, 29: 3.0, 14: -1.0, 15: -1.0},
    6:  {14: -1.0, 15: -1.0},
    7:  {14: -1.0, 15: -1.0},
    9:  {14: -1.0, 15: -1.0},
   10:  {14: -1.0, 15: -1.0},
   11:  {14: -1.0, 15: -1.0}}
```

At step 14, 8-bit or octal OPCODES are generated as follows:
Octal values follow #

We start from here on 14 PPEM, delta −2.0, pointBase 0, repeatCount 1, deltaIncrement +1.0. In the description column below each entry ends with a notation showing (new PPEM, new delta, new pointbase):

| Instruction | Encoded Value | Description |
|-------------|---------------|-------------|
| 1 | 111 | Advance to next delta (14, −1.0, 0) |
| 5, 3, 0 | 10 011 000 | Move points 0-3 by −1.0 (14, −1.0, 5) |
| 5, 2, 0 | 10 010 000 | Move points 5-7 by −1.0 (14, −1.0, 9) |
| 5, 2, 0 | 10 010 000 | Move points 9-11 by −1.0 (14, −1.0, 13) |
| 0 | 110 | Advance to next PPEM (15, −2.0, 0) |
| 1 | 111 | Advance to next delta (14, −1.0, 0) |
| 5, 3, 0 | 10 011 000 | Move points 0-3 by −1.0 (15, −1.0, 5) |
| 5, 2, 0 | 10 010 000 | Move points 5-7 by −1.0 (15, −1.0, 9) |
| 5, 2, 0 | 10 010 000 | Move points 9-11 by −1.0 (15, −1.0, 13) |
| 0 | 110 | Advance to next PPEM (16, −2.0, 0) |
| 4, 1 | 01 111 | Move point 1 by −2.0 (16, −2.0, 3) |
| 1 | 111 | Advance to next delta (16, 1.0, 0) |
| 4, 2 | 01 011 | Move point 2 by −1.0 (16, −1.0, 4) |
| 6, 4 | 00101 1000 | Set repeatCount to 8 (16, −1.0, 4) |
| 0 | 110 | Advance 8 PPEMs (24, −2.0, 0) |
| 1 | 111 | Advance to next delta (24, −1.0, 0) |
| 4, 2 | 01 011 | Move point 2 by −1.0 (24, −1.0, 4) |
| 0, 0, 0 | 110 110 110 | Advance 3 PPEMs (27, −2.0, 0) |
| 1, 1 | 111 111 | Advance 2 delta steps (27, +1.0, 0) |
| 4, 0 | 01 10 | Move point 0 by +1.0 (27, +1.0, 2) |
| 0 | 110 | Advance to next PPEM (28, −2.0, 0) |
| 1, 1, 1 | 111 111 111 | Advance 3 delta steps (28, +2.0, 0) |
| 4, 5 | 01 000 | Move point 5 by +2.0 (28, +2.0, 7) |
| 0 | 110 | Advance to next PPEM (29, −2.0, 0) |
| 1, 1 | 111 111 | Advance 2 delta steps (29, +1.0, 0) |
| 4, 0 | 01 10 | Move point 0 by +1.0 (29, +1.0, 2) |
| 1, 1 | 111 111 | Advance 2 delta steps (29, +3.0, 0) |
| 4, 5 | 01 000 | Move point 5 by +3.0 (29, +3.0, 7) |
| 7 | 00100 | End of instructions |

The bitfields listed above are concatenated into a single long bitfield, which is then broken up into runs of 16 bits. This results in the following 16-bit words:

```
F312
121B
CC48
4867
F796
375E
DBF6
DFF4
6FDB
F410
```

At step 18, the OPCODES and argument values are pushed onto a TrueType stack.

Figure 2:
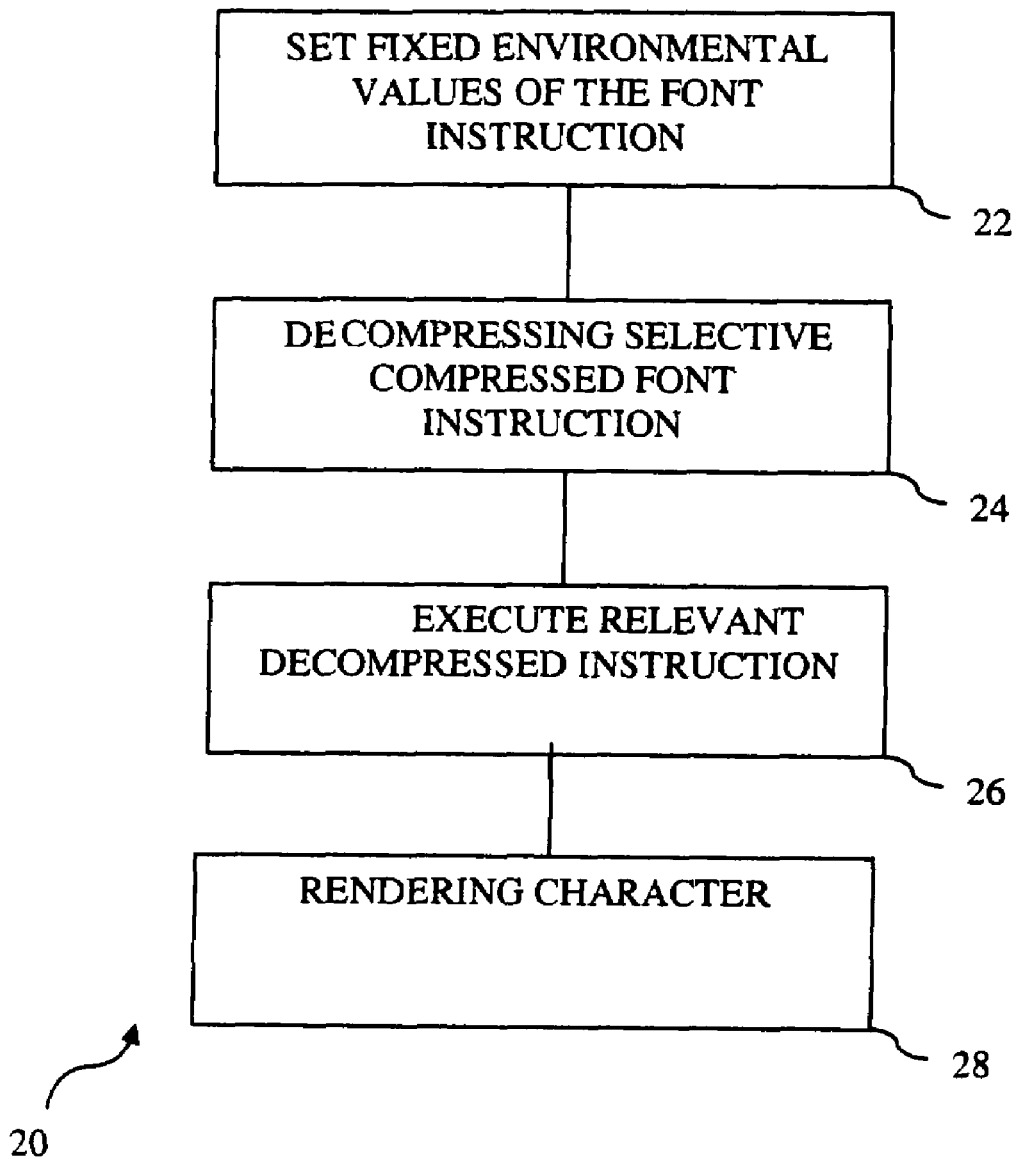
FIG. 2 is a flowchart representing a method for rendering a glyph from a font set having compressed font instruction in accordance with the present invention.

Referring now to FIG. 2, rendering method 20 renders fonts which have font instruction compressed in accordance with the font instruction compression method 10. Continuing with reference to the DELTAP compression example, at step 22, the four fixed environmental values generated by method 10 are read as their respective 16-bit words.

At step 24, the 16-bit words representing the compressed octal OPCODES are read and decompressed. At step 26, only relevant code is executed, ignoring code pertaining to environmental values which include, but are not limited to, pixel-per-em values, as those variables are accounted for in the four fixed values.

The decompression and execution code knows the current pixels-per-em being rendered because TrueType maintains this information as part of its internal state while executing TrueType instructions. For instance, TrueType OPCODE MPPEM pushes the current pixels-per-em value onto the stack. Since decompression and execution happen as part of TrueType instruction they have access to this information.

Finally, at step 28, the executed instruction is used to render the glyph.

Methods 10 and 20 can be incorporated as a library script or as a stand alone computer program which is executed in an appropriate computer operating system to read binary font instruction, such as TrueType hints. Preferably, the present method converts binary hints into 16-bit words having a compression of at least 60% and, more preferably, compressed at least 70% over the original font instruction size. The present method can use various forms of compression, such as native TrueType compression which produces fonts which can run on any standard TrueType interpreter and AA-255 compression which produces fonts which can only run on iType 2.45 or higher, but with vastly improved performance over native TrueType compression.

It will now be apparent to one of ordinary skill in the art that the present font instruction compression method has advantages, in terms of improving font rendering speed and efficiency, as compared with conventional scalable font rendering, such as TrueType font rendering. The present method allows for compression, both in terms of representing conventional font instruction, such as one-byte hint script as OPCODES, and also by further compressing the OPCODES to multiple-bit words or values, such as a 16-bit word.

Although the invention has been described above in relation to preferred embodiments thereof, it will be understood by those skilled in the art that variations and modifications can be effected in these preferred embodiments without departing from the scope and spirit of the invention.

The invention claimed is:

1. A method for processing by a computer font data comprising font instruction to provide improved font rendering by said computer upon display or printing, said method comprising:

analyzing by a computer operating system a set of pixels-per-em values and fractional pixel shifts contained in the font instruction, which is present in a library script or computer program, for each glyph in a font data to construct a database of values;

converting by said computer operating system said pixels-per-em values and said fractional pixel shifts into shorthand notation having a form of operational codes and argument values for each glyph in the font data; and compressing by said computer operating system the operational codes and the argument values into a compressed data stream comprising a series of multiple-bit words representing the font instruction specifications for each glyph in the font data which were originally represented as said pixel-per-em values and said fractional pixel shifts;

setting by said computer operating system fixed values corresponding to environmental variable values for each glyph;

decompressing the multi-bit words representing font instruction specifications; and executing the font instruction specifications decompressed in absence of said environmental variable values thereby executing a reduced amount of code to render font glyphs.

2. The method of claim 1, wherein said font instruction is selected from the group consisting of DELTAP1, DELTAP2, DELTAP3, SDS, SDB, SVTCA, PUSHB, PUSHW, NPUSHB, and NPUSHW.

3. The method of claim 1, wherein the operational codes and the argument values are variable length codes.

4. The method of claim 1, wherein said multiple-bit words comprise 16-bit words.

5. The method of claim 3, wherein the compressing of the variable length codes of the operational codes and the argument values results in at least 60 percent data compression of the font instruction.

6. The method of claim 1, wherein said fixed values corresponding to said environmental variable values correspond to:
(1) a numerically lowest shift value present for any point-per-em for the glyph,
(2) a shift increment,
(3) a lowest point-per-em value for which hints in the font instruction are present, and
(4) a packed multiple-bit value comprising fields comprising a point-per-em value, a count and a phase for use when decompressing the font instruction.

7. A method of processing by a computer for rendering a glyph from font data having compressed font instruction data in a form of a series of multiple-bit word or words representing shorthand notation for pixels-per-em values and fractional pixel shifts forming font instruction specifications and fixed environmental values for respective glyphs in the font data to provide improved font rendering by said computer upon display or printing, said method comprising:

setting by a computer system fixed values corresponding to environmental variable values for a glyph for:
(1) a numerically lowest shift value present for any point-per-em for the glyph,
(2) a shift increment,
(3) a lowest point-per-em value for which hints in the font instruction data are present, and
(4) a packed multiple-bit value comprising fields comprising a point-per-em value, a count and a phase for use when decompressing the font instruction data;

decompressing by said computer system the multiple-bit word or words corresponding to font instruction; and executing by said computer system only relevant font instruction specifications, which is in absence of said fixed values corresponding to said environmental variable values, for the glyph thereby executing a reduced amount of code to render font glyphs.

8. The method of claim 7, wherein said font instruction is selected from the group consisting of DELTAP1, DELTAP2, DELTAP3, SDS, SDB, SVTCA, PUSHB, PUSHW, NPUSHB, and NPUSHW.

9. The method of claim 7, further comprising rendering the glyph using the multiple-bit word or words provided following said decompressing.

10. A method for processing by a computer font data comprising font instruction to provide improved font rendering by said computer upon display or printing, said method comprising:

analyzing by a computer system a set of pixels-per-em values and fractional pixel shifts contained in the font instruction for each glyph in the font data to construct a database of values;

converting by said computer system said set of pixels-per-em values and fractional pixel shifts into shorthand notation having a form of operational codes and argument values for each glyph in the font data;

compressing by said operating system the operational codes and the argument values into a compressed data stream comprising a series of multiple-bit word or words representing font instruction specifications for each glyph in the font data which were originally represented as said pixels-per-em values and said fractional pixel shifts;

setting by said computer operating system fixed values corresponding to environmental variable values for each glyph for:
(1) a numerically lowest shift value present for any point-per-em for the glyph,
(2) a shift increment,
(3) a lowest point-per-em value for which hints in the font instruction are present, and
(4) a packed multiple-bit word comprising a point-per-em value, a count and a phase for use when decompressing the font instruction;

decompressing by said operating system the multiple-bit word or words corresponding to the font instruction; and executing by said operating system only relevant font instruction specifications for a respective glyph and not multiple-bit words corresponding to the font instruction for the fixed values corresponding to said environmental variable values thereby executing a reduced amount of code to render font glyphs.

11. The method of claim 10, wherein said font instruction is selected from the group consisting of DELTAP1, DELTAP2, DELTAP3, SDS, SDB, SVTCA, PUSHB, PUSHW, NPUSHB, and NPUSHW.

12. The method of claim 10, further comprising rendering the glyph using the multiple-bit word or words provided following said decompressing.

13. The method of claim 10, wherein the operational codes and the argument values are represented by variable length words.

14. The method of claim 10, wherein the multiple-bit word or words are 16-bit words.

* * * * *